Patented Mar. 2, 1948

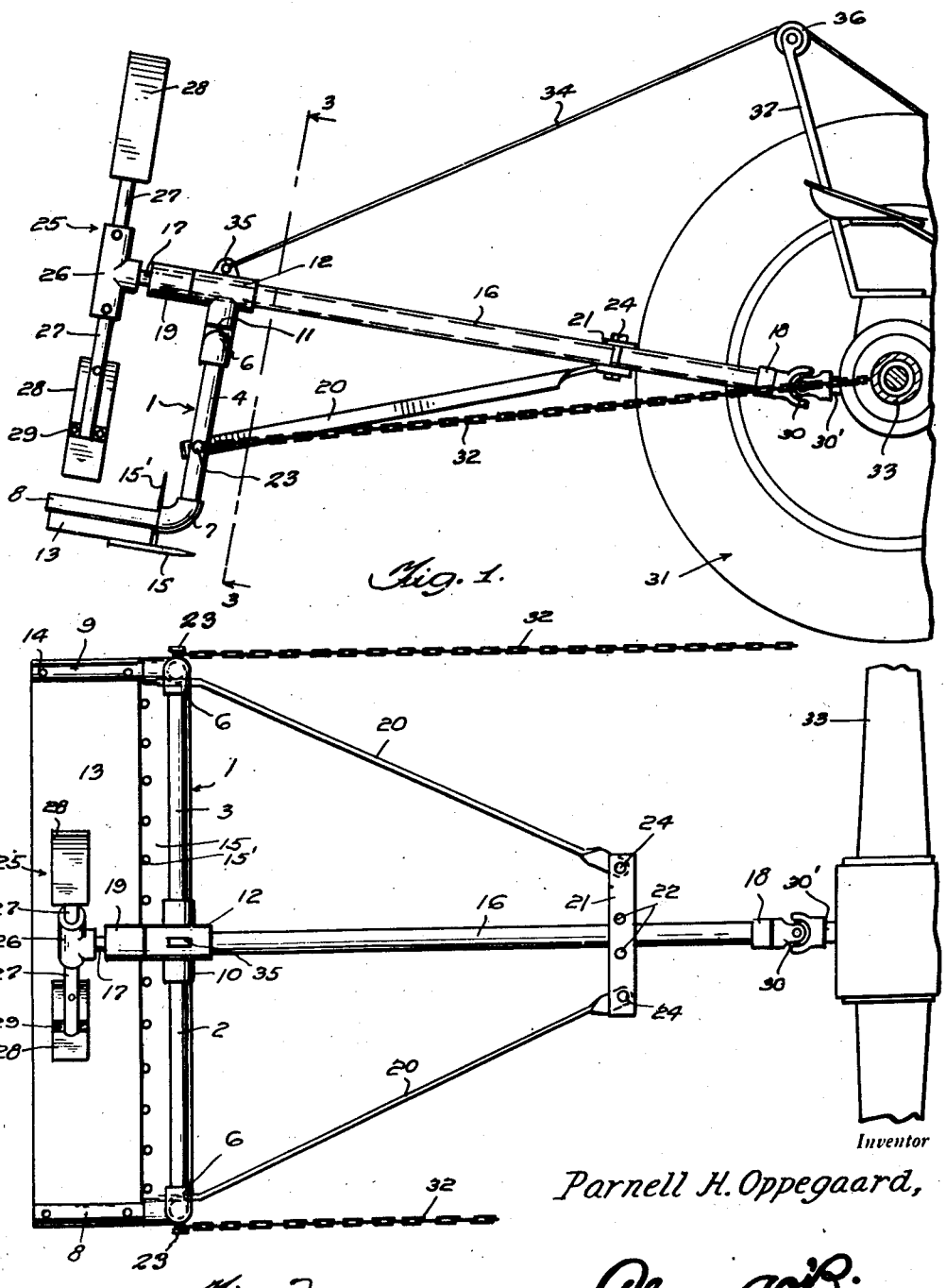

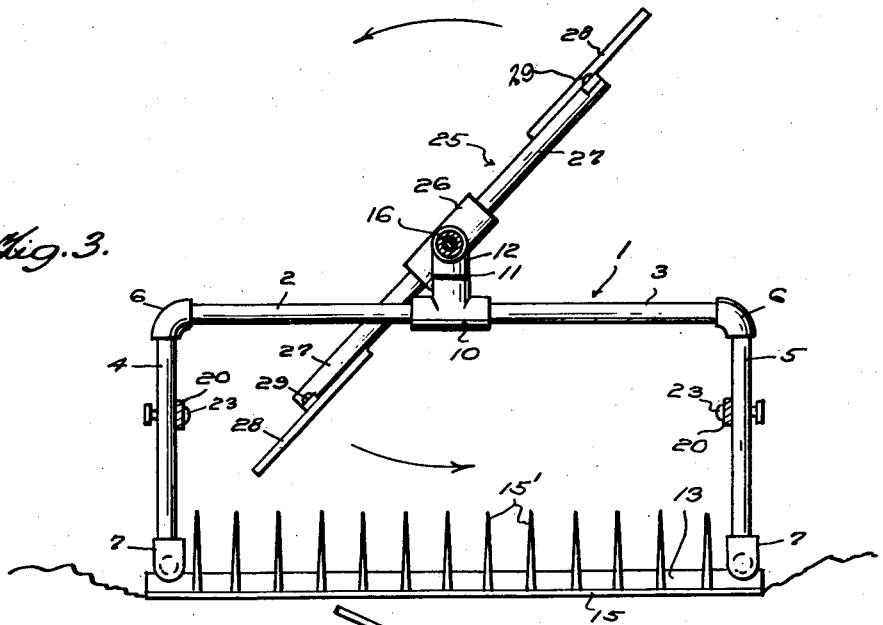
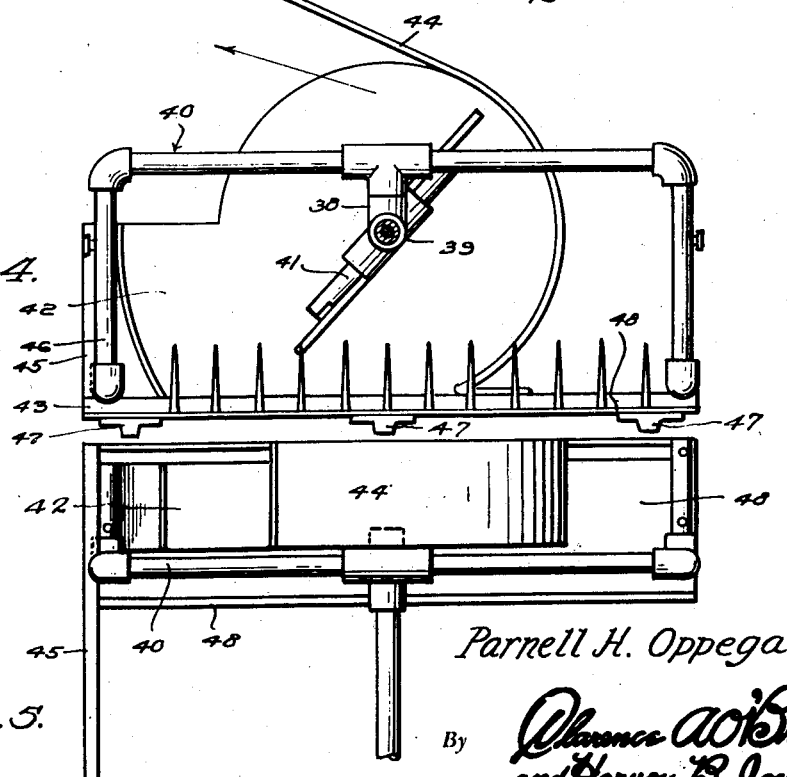

2,437,116

UNITED STATES PATENT OFFICE 2,437,116

SNOW PLOW

Parnell H. Oppegaard, McIntosh, Minn.

Application June 24, 1946, Serial No. 679,015

6 Claims. (Cl. 37—43)

My invention relates to improvements in snow plows of the tractor operated type.

The primary object of the invention is to provide a simply constructed, inexpensive device for attachment to a tractor to be dragged along the ground and which is equipped for operation to take up snow and throw the same to one side of the path of travel of the tractor in a manner to scatter snow so as to obviate the formation of drifts and ridges.

Another object is to provide a device of the class and for the purposes set forth which is adapted for operation by the power take-off of the tractor to break up and scatter the snow, and which is swingable on the tractor into a position for carrying when not in use.

Other and subordinate objects, also comprehended by my invention, together with the precise nature of my improvements, and the advantages thereof, will be readily understood when the succeeding description and claims are read with reference to the drawings accompanying and forming part of this application.

In the said drawings;

Figure 1 is a view in side elevation, partly in section, illustrating my improved snow plow in a preferred embodiment thereof, Figure 2 is a view in plan, Figure 3 is a view in vertical transverse section on the line 3—3 of Figure 1, Figure 4 is a similar view of a modified embodiment of my invention, Figure 5 is a fragmentary view in plan of the modified embodiment.

Referring to the drawings by numerals, and first to Figures 1 through 3, my improved snow plow in the preferred embodiment thereof, comprises a drag frame 1 of inverted U-shape adapted to extend crosswise of the path of travel of the tractor and which is formed, preferably, of pipe with a pair of aligned top sections 2, 3 to the outer ends of which upright side sections 4, 5 are connected by elbows 6, said side sections having connected to the lower ends thereof, by elbows 7, a pair of shorter trailing foot sections 8, 9 extending therefrom at substantially a right angle. A T-coupling 10 connects the inner ends of the top sections 2, 3 in the center of the frame 1 and which has suitably secured thereto, as by a nipple 11, an upstanding T-coupling 12 for a purpose presently explained.

A platform member 13 in the form of a heavy plank is secured at its ends, as by bolts 14, to the foot sections 8, 9 preferably beneath the same.

A scraper blade 15, of suitable metal, extends along the front edge of the platform member 13 beneath the same and is suitably secured to said member by means, not shown, to project forwardly of the front edge of said member.

Prongs 15', for a purpose presently seen, arise from the scraper blade 15, adjacent the front edge of the platform member 13, and above said edge and are spaced along said blade 15 equidistantly.

A tubular reach member 16 extends forwardly from the T-coupling 12 with a rear end thereof suitably fixed in said coupling.

A beater operating shaft 17 is rotatably extended through said reach member 16 and journalled therein, its front and rear ends extending out of the same a suitable distance for a purpose presently clear. Front and rear end collars 18, 19 suitably fixed on said shaft 17, one behind the T-coupling 12, and the other in front of the reach member 16, prevent endwise play of the beater operating shaft in the reach member 16.

Diagonal brace bars 20 extend forwardly from the upright side sections 4, 5 to a pair of crossbars 21 on the reach member 16 bolted together, as at 22, to clamp said member therebetween, said bars being bolted to said sections 4, 5 as at 23, and to said cross-bars, as at 24.

A rotary beater 25 is provided on the rear end of the beater operating shaft 17 and fixed thereon to rotate over the platform 13 crosswise of the path of travel of the tractor and drag frame 1. The beater 25 may take various forms, but, preferably comprises a T-coupling form of hub 26 suitably fixed on the shaft 17 with a pair of rod-like arms 27 extending oppositely therefrom and which are equipped at the outer ends thereof with flat elongated beater blades 28 extending lengthwise of said arms 27 and suitably bolted thereto, as at 29. The beater blades 28 are arranged to be revolved crosswise of the axis of revolution of the beater 25.

A universal joint coupling 30 is provided between the front end of the beater operating shaft 17 and the power take-off shaft 30' of the tractor shown in part at 31 as provided with the present equipment. A pair of pull chains 32 connected to the upright side members 4, 5 by the bolts 23 and suitably attached to the axle housing 33 of the tractor 31 prevents twisting of the drag frame 1 on the reach member 16.

A pull cable 34 is connected at one end, as at 35, to the T-coupling 12 and trained over a pulley 36 on an upright 37 arising from the axle housing 33, said cable being designed for operation in any suitable manner to swing the drag frame 1, the reach member 16, and the beater operating shaft 17 upwardly into a suitable position for carrying of the device when not in use.

As will be observed in Figure 1, the reach member 16 and the beater operating shaft 17 are designed to extend upwardly and rearwardly when the scraper blade 15 is not in use, and the drag frame is arranged so that the scraper blade 15 and the platform member 13 extend forwardly and downwardly, when said blade is in use, all to the end that said blade will be pulled downwardly into the snow, and the platform member 13 will accumulate or pick-up snow thereon.

Referring now to the operation of the described embodiment of my invention. As the device is pulled by the tractor 31, the scraper blade 15 is caused to bite downwardly in the snow to dig into the same, and the platform member 8 is caused to plow similarly into the snow and pick-up the same, the beater 25 breaking up the snow and throwing the same to one side in finely divided form, thus scattering the same to one side of the path of travel of the tractor. The prongs 15', prevent clods of dirt, rocks and the like, from fouling the beater 25. The beater 25 also acts as a fan tending to blow the snow rearwardly and sidewise.

In the modified embodiment of the invention shown in Figures 4 and 5, the T-coupling 38, corresponding to T-coupling 12, supports the reach member 34 in underslung position relative to the drag frame 40, which has been found advantageous when said member is coupled to a low small tractor.

The beater 41 revolves in an open front, open top, collector casing 42 suitably fixed to the drag frame 40 and platform member 43 and which is provided with a laterally and upwardly inclined top deflector plate 44 for directing snow out of the collector casing 42 upwardly to one side of the path of travel of said frame.

A side guide board 45 extends forwardly from one upright side section 46 of the drag frame 40 to guide snow into the collector casing 42.

Low bar-like runners 47 are provided on the scraper blade 48 and the platform member 43.

Otherwise the construction and operation of the modified embodiment is the same as in the preferred embodiment of the invention.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

I claim as my invention:

1. In a snow plow for attachment to a tractor having a rear power take-off shaft, a drag frame adapted to be pulled forwardly by the tractor, a scraper blade on said frame adapted to dig forwardly into snow in the path of travel of said frame and pick up the same, a platform member on said frame in the rear of said blade adapted to accumulate snow thereon picked up by said blade, and means to break up the snow on the platform member and scatter the same to one side of the path of travel of the frame including a rotary operating shaft having a rear end journalled on said frame against endwise movement forwardly thereof to exert a pull on said frame and provided on the front end thereof with a universal coupling adapted to be connected to said take-off shaft.

2. In a snow plow for attachment to a tractor having a rear power take-off shaft, a drag frame adapted to be pulled forwardly by the tractor, a scraper blade on said frame adapted to dig forwardly into snow in the path of travel of said frame and pick up the same, a platform member on said frame in the rear of said blade adapted to accumulate snow thereon picked up by said blade, and means to break up the snow on the platform member and scatter the same to one side of the path of travel of the frame including a rotary operating shaft having a rear end journalled on said frame against endwise movement forwardly thereof to exert a pull on said frame and provided on the front end thereof with a universal coupling adapted to be connected to said take-off shaft, and a beater fast on the operating shaft above said platform member for rotation by said operating shaft.

3. In a snow plow for attachment to a tractor having a rear power take-off shaft, a drag frame adapted to be pulled forwardly by the tractor, a scraper blade on said frame adapted to dig forwardly into snow in the path of travel of said frame and pick up the same, a platform member on said frame in the rear of said blade adapted to accumulate snow thereon picked up by said blade, and means to break up the snow on the platform member and scatter the same to one side of the path of travel of the frame including a rotary operating shaft having a rear end journalled on said frame against endwise movement forwardly thereof to exert a pull on said frame and provided on the front end thereof with a universal coupling adapted to be connected to said take-off shaft, a beater fast on the operating shaft above said platform member for rotation by said operating shaft, and upstanding members on said blade in front of said platform member for preventing dirt dug up by said blade from fouling said beater.

4. In a snow plow for attachment to a tractor having a rear power take-off shaft, a drag frame adapted to be pulled forwardly by the tractor, a scraper blade on said frame adapted to dig forwardly into snow in the path of travel of said frame and pick up the same, a platform member on said frame in the rear of said blade adapted to accumulate snow thereon picked up by said blade, and means to break up the snow on the platform member and scatter the same to one side of the path of travel of the frame including a rotary operating shaft having a rear end journalled on said frame against endwise movement forwardly thereof to exert a pull on said frame and provided on the front end thereof with a universal coupling adapted to be connected to said take-off shaft, and manipulative means adapted for operation from said tractor to lift said frame and swing said shaft upwardly for carrying when not in use.

5. In a snow plow for attachment to a tractor having a rear power take-off shaft, a drag frame adapted to be pulled forwardly by the tractor, a scraper blade on said frame adapted to dig forwardly into snow in the path of travel of said frame and pick up the same, a platform member on said frame in the rear of said blade adapted to accumulate snow thereon picked up by said blade, and means to break up the snow on the platform member and scatter the same to one side of the path of travel of the frame including a rotary operating shaft having a rear end journalled on said frame against endwise movement forwardly thereof to exert a pull on said frame and provided on the front end thereof with a universal coupling adapted to be connected to said take-off shaft, said platform member and blade being provided with runners.

6. In a snow plow for attachment to a tractor having a rear power take-off shaft, a drag frame adapted to be pulled forwardly by the tractor, a scraper blade on said frame adapted to dig forwardly into snow in the path of travel of said frame and pick up the same, a platform member on said frame in the rear of said blade adapted to accumulate snow thereon picked up by said blade, and means to break up the snow on the platform member and scatter the same to one side of the path of travel of the frame including a rotary operating shaft having a rear end journalled on said frame against endwise movement forwardly thereof to exert a pull on said frame and provided on the front end thereof with a universal coupling adapted to be connected to said take-off shaft, and a beater fast on the operating shaft above said platform member for rotation by said operating shaft, said platform member having a snow collecting casing therein in which said beater is adapted to rotate, said casing being provided with an upper deflecting plate for directing snow issuing out of the casing laterally of the path of travel of the drag frame.

PARNELL H. OPPEGAARD.